United States Patent
Hruschka et al.

(10) Patent No.: US 9,052,586 B2
(45) Date of Patent: Jun. 9, 2015

(54) ARRANGEMENT HAVING A DRAWER HOUSING AND A DRAWER

(71) Applicants: Klaus Hruschka, Erbendorf (DE); Michael Kleber, Eslarn (DE)

(72) Inventors: Klaus Hruschka, Erbendorf (DE); Michael Kleber, Eslarn (DE)

(73) Assignee: Siemens Aktiengesellschaft, München (DE)

( * ) Notice: Subject to any disclaimer, the term of this patent is extended or adjusted under 35 U.S.C. 154(b) by 266 days.

(21) Appl. No.: 13/679,790

(22) Filed: Nov. 16, 2012

(65) Prior Publication Data

US 2013/0129055 A1    May 23, 2013

(30) Foreign Application Priority Data

Nov. 18, 2011   (DE) .......................... 10 2011 086 657

(51) Int. Cl.
*G03B 42/02* (2006.01)
*A47B 81/00* (2006.01)

(52) U.S. Cl.
CPC .............. *G03B 42/025* (2013.01); *A47B 81/00* (2013.01)

(58) Field of Classification Search
USPC ................................. 378/167, 177, 178, 188
See application file for complete search history.

(56) References Cited

U.S. PATENT DOCUMENTS

| | | | |
|---|---|---|---|
| 7,144,157 B2 | 12/2006 | Dippl et al. | |
| 7,441,951 B2 | 10/2008 | Rauh | |
| 7,857,511 B2 | 12/2010 | Hesl et al. | |

FOREIGN PATENT DOCUMENTS

| | | |
|---|---|---|
| DE | 103 56 289 A1 | 6/2005 |
| DE | 103 56 288 A1 | 7/2005 |
| DE | 10 2004 061 506 A1 | 6/2006 |

OTHER PUBLICATIONS

German Office Action dated Jul. 27, 2012 for corresponding German Patent Application No. DE 10 2011 086 657.4 with English translation.

*Primary Examiner* — Nicole Ippolito
*Assistant Examiner* — Hanway Chang
(74) *Attorney, Agent, or Firm* — Lempia Summerfield Katz LLC

(57) ABSTRACT

An arrangement includes a drawer housing and a drawer intended for an image-recording device of an x-ray-image device to be placed in the drawer. The arrangement includes a pull-out device, using which the drawer is moveable across a slanting plane while being withdrawn from or inserted into the drawer housing. A floor of the drawer remains parallel to a floor of the drawer housing.

20 Claims, 1 Drawing Sheet

ARRANGEMENT HAVING A DRAWER HOUSING AND A DRAWER

This application claims the benefit of DE 10 2011 086 657.4, filed on Nov. 18, 2011, which is hereby incorporated by reference.

BACKGROUND

The present embodiments relate to an arrangement having a drawer housing and a drawer intended for an image recording device of an x-ray-image device to be placed in the drawer.

Drawer housings having a drawer intended for an image-recording device to be placed in the drawer are employed in x-ray devices. The term "drawer" describes a container intended for accommodating an object and capable of being inserted into or withdrawn from the drawer housing. X-ray devices have an x-ray source for producing x-rays that pass through a body and are recorded by the image-recording device. The image-recording device may be imaging cassettes for x-ray films, storage-film cassettes, or x-ray-image detectors for digital image recording. The image-recording device is, for that purpose, to be positioned within the x-ray beam generated by the x-ray source. Positioning is by the drawer, in which the image-recording device is placed and which, with the image-recording device emplaced therein, is inserted into the drawer housing, which, for example, is integrated in a patient examination table associated with the x-ray device. Above the drawer housing, an automatic-exposure chamber (e.g., an iontomat chamber) may be arranged in the patient examination table, and above the chamber, an anti-scatter grid may be arranged. The distance between the drawer when the drawer has been pushed into the drawer housing and the iontomat chamber may be as small as possible to achieve a small distance between the image-recording device and the patient. However, to allow the image receiver to be placed easily in the drawer, which may not be fully withdrawn from the drawer housing, the distance from the iontomat chamber is greater, so as to preclude the disruptive effect caused during the emplacement process by a lower edge of a top side of the drawer housing.

Known from publication DE 103 56 288 A1 is a drawer housing having a drawer that is intended for an image-recording device to be placed in the drawer and is guided along telescopic rails. Using telescopic rails enables the drawer to be fully withdrawn from the drawer housing. As a result, it may be easy for medical personnel to place the image-recording device in or remove the image-recording device from the drawer.

SUMMARY AND DESCRIPTION

A disadvantage of solution presented above is that the use of telescopic rails is associated with higher production costs.

The present embodiments may obviate one or more of the drawbacks or limitations in the related art. For example, an improved arrangement having a drawer housing and a drawer intended for an image-recording device of an x-ray-image device to be placed in the drawer is provided.

One embodiment of an arrangement includes a drawer housing and a drawer intended for an image recording device of an x-ray-image device to be placed in the drawer. The arrangement includes a pull-out device, by which the drawer may be moved across a slanting plane while being withdrawn from or inserted into the drawer housing. A floor of the drawer remains parallel to a floor of the drawer housing. What is advantageously achieved thereby is that the drawer will, in a withdrawn position, be at a greater distance from a lower front edge of a top side of the drawer housing. As a result, it is easier to place the image-recording device in the drawer. It is provided that with the drawer inserted, the distance between the image-recording device placed in the drawer and other components of the x-ray-image device that are located above the drawer housing such as, for example, an automatic-exposure (iontomat) chamber or an anti-scatter grid located above the drawer housing may be kept as small as possible. This will result in an improvement in the quality of an image recording that is produced.

In one embodiment, the pull-out device may include a first guide and a second guide. The second guide is located movably in the first guide. The processes of withdrawing from and inserting into the drawer housing are provided via the movable arrangement of the second guide in the first guide.

In another embodiment, the first guide may be located internally on two side walls of the drawer housing and includes two mutually opposite, slanted guide slots. The second guide may be located externally on two side walls of the drawer and includes two mutually opposite, slanted guide rails. The slanted guide rails located movably in the slanted guide slots enable the drawer to be moved across a slanting plane.

The guide rails and the guide slots may advantageously be slide bearings, by which even easy movement of the guide rails in the guide slots may be realized in a simple manner.

The drawer may include at least one collet, via which the image-recording device may be fixed to the drawer. The image-recording device is fixed to the drawer so that the position of the image-recording device placed in the drawer remains unchanged while the drawer is being pushed into the drawer housing and during image recording. Using a collet allows this to be realized in a simple manner.

An embodiment of an x-ray-image device having an arrangement is also provided.

DETAILED DESCRIPTION OF THE DRAWINGS

Figure 1:
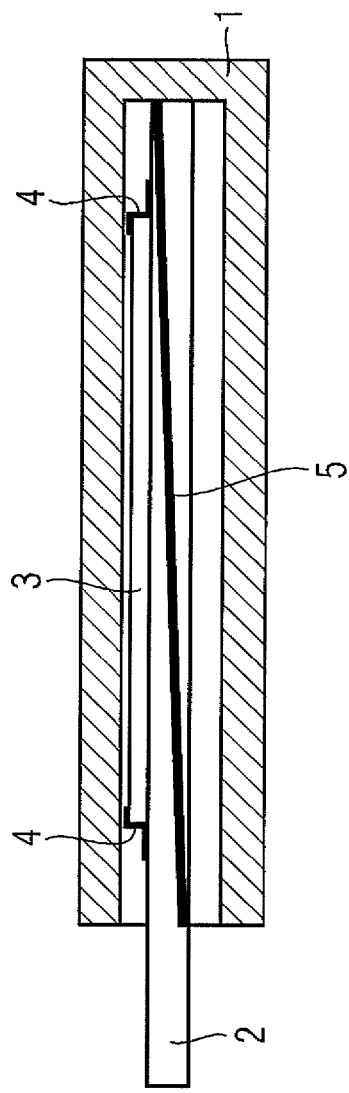
FIG. 1 is a side view of one embodiment of an arrangement having a drawer that has been inserted into a drawer housing.

FIG. 1 is a side view of one embodiment of an arrangement having a drawer that has been inserted into a drawer housing. A drawer 2 in an inserted position is located in a drawer housing 1 that is integrated, for example, in a patient examination table (not shown) associated with an x-ray-image device. An image-recording device 3 that has been fixed to the drawer 2 using two collets 4 attached to the drawer 2 is placed in the drawer 2. The drawer 2 includes two mutually opposite, slanting guide rails 5 arranged on two side walls of the drawer 2 that extend parallel to a direction, in which the drawer 2 is inserted. Only one guide rail 5 is shown in FIG. 1 because of the side view. Guide rails 5 are located movably in two mutually opposite, slanting guide slots (not shown) attached to two side walls of the drawer housing 1 that extend parallel to a direction, in which the drawer 2 is inserted. The drawer 2 is in the inserted condition located in drawer housing 1 such that a distance between the image-recording device 3 placed in the drawer 2 and a top underside of the drawer housing 1 is as small as possible. It is thereby provided that the image-recording device 3 is positioned as close as possible to components of the x-ray-image device located above the drawer housing 1 such as, for example, an automatic-exposure chamber (not shown) or an anti-scatter grid (not shown) located above the drawer housing 1. Through the arrangement of guide rails 5 and guide slots 6, the drawer 2 may be withdrawn from the drawer housing 1 such that the drawer 2 may be moved along a slanting plane, with a floor of the drawer 2 remaining parallel to a floor of the drawer housing 1.

Figure 2:
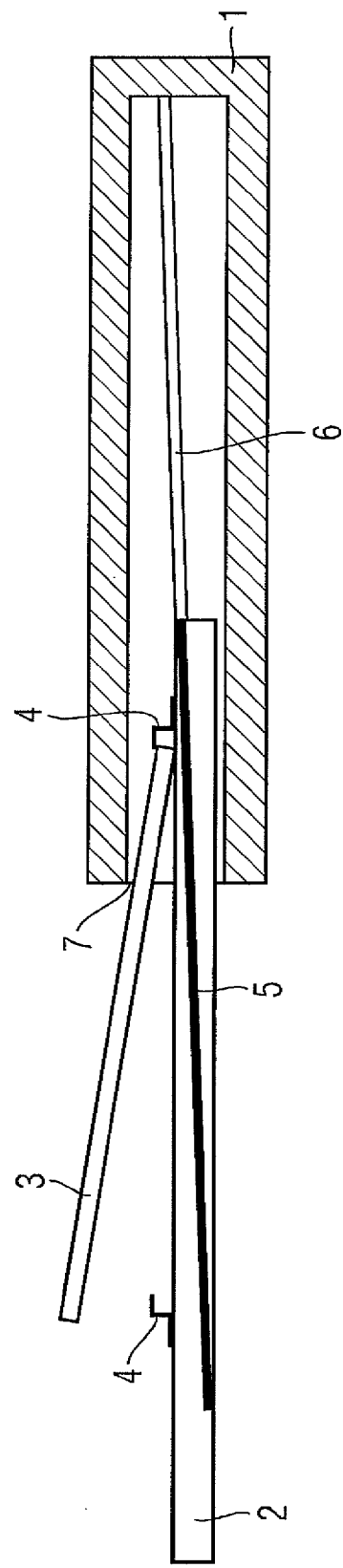
FIG. 2 is a side view of one embodiment of an arrangement having a drawer that has been withdrawn from a drawer housing.

FIG. 2 is a side view of one embodiment of an arrangement having a drawer that has been withdrawn from a drawer housing. A drawer 2 in a position withdrawn from a drawer housing 1 is integrated, for example, in a patient examination table (not shown) associated with an x-ray-image device. An image-recording device 3 that may be fixed to the drawer 2 by two collets 4 attached to the drawer 2 may be placed in the drawer 2. The drawer 2 includes two mutually opposite, slanting guide rails 5 arranged on two side walls of the drawer 2 that extend parallel to a direction, in which the drawer 2 is withdrawn. Guide rails 5 are located movably in two mutually opposite, slanting guide slots 6 attached to two side walls of the drawer housing 1 that extend parallel to a direction, in which the drawer 2 is withdrawn. In each case, only one guide rail 5 and one guide slot 6 is shown in FIG. 2 because of the side view. The drawer 2 will, in the withdrawn position, be at a greater distance from lower front edge 7 of a top side of the drawer housing 1 than in an inserted position. As a result, it is easier for medical personnel to place the image-recording device 3 in the drawer 2. Through the arrangement of the guide rails 5 and the guide slots 6, the drawer 2 may be inserted into the drawer housing 1 such that the drawer 2 may be moved along a slanting plane with the floor of the drawer 2 remaining parallel to a floor of the drawer housing 1.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An arrangement comprising:
   a drawer housing and a drawer for an image recording device of an x-ray-image device to be placed in the drawer; and
   a pull-out device, by which the drawer is movable across a slanting plane while being withdrawn from or inserted into the drawer housing, a floor of the drawer remaining parallel to a floor of the drawer housing.

2. The arrangement as claimed in claim 1, wherein the pull-out device includes a first guide and a second guide, the second guide being located movably in the first guide.

3. The arrangement as claimed in claim 2, wherein the first guide is located internally on two side walls of the drawer housing and comprises two mutually opposite, slanted guide slots.

4. The arrangement as claimed in claim 3, wherein the two mutually opposite, slanted guide slots comprise slide bearings.

5. The arrangement as claimed in claim 4, wherein the drawer includes at least one collet, via which the image recording device is fixable to the drawer.

6. The arrangement as claimed in claim 3, wherein the drawer includes at least one collet, via which the image recording device is fixable to the drawer.

7. The arrangement as claimed in claim 2, wherein the second guide is located externally on two side walls of the drawer and comprises two mutually opposite, slanted guide rails.

8. The arrangement as claimed in claim 7, wherein the two mutually opposite, slanted guide rails comprise slide bearings.

9. The arrangement as claimed in claim 8, wherein the drawer includes at least one collet, via which the image recording device is fixable to the drawer.

10. The arrangement as claimed in claim 7, wherein the drawer includes at least one collet, via which the image recording device is fixable to the drawer.

11. The arrangement as claimed in claim 2, wherein the drawer includes at least one collet, via which the image recording device is fixable to the drawer.

12. The arrangement as claimed in claim 1, wherein the drawer includes at least one collet, via which the image recording device is fixable to the drawer.

13. An x-ray-image device comprising:
    an arrangement comprising:
       a drawer housing and a drawer for an image recording device of an x-ray-image device to be placed in the drawer; and
       a pull-out device, by which the drawer is movable across a slanting plane while being withdrawn from or inserted into the drawer housing, a floor of the drawer remaining parallel to a floor of the drawer housing.

14. The x-ray-image device as claimed in claim 13, wherein the pull-out device includes a first guide and a second guide, the second guide being located movably in the first guide.

15. The x-ray-image device as claimed in claim 14, wherein the first guide is located internally on two side walls of the drawer housing and comprises two mutually opposite, slanted guide slots.

16. The x-ray-image device as claimed in claim 15, wherein the two mutually opposite, slanted guide slots comprise slide bearings.

17. The x-ray-image device as claimed in claim 14, wherein the second guide is located externally on two side walls of the drawer and comprises two mutually opposite, slanted guide rails.

18. The x-ray-image device as claimed in claim 17, wherein the two mutually opposite, slanted guide rails comprise slide bearings.

19. The x-ray-image device as claimed in claim 14, wherein the drawer includes at least one collet, via which the image recording device is fixable to the drawer.

20. The x-ray-image device as claimed in claim 13, wherein the drawer includes at least one collet, via which the image recording device is fixable to the drawer.

* * * * *